(12) United States Patent
Demers et al.

(10) Patent No.: US 6,227,798 B1
(45) Date of Patent: May 8, 2001

(54) TURBINE NOZZLE SEGMENT BAND COOLING

(75) Inventors: Daniel E. Demers, Ipswich; Mark D. Gledhill, Hamilton; Aureen C. Currin, Reading; Gene C. F. Tsai, Lexington, all of MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/451,279

(22) Filed: Nov. 30, 1999

(51) Int. Cl.⁷ ................................ F01D 5/14; F03B 11/00
(52) U.S. Cl. .................... 415/115; 416/186 R; 416/232
(58) Field of Search ............................. 415/115, 208.1, 415/175, 202, 191; 416/232, 186 R

(56) References Cited

U.S. PATENT DOCUMENTS

| | | | |
|---|---|---|---|
| 4,017,207 | * | 4/1977 | Bell et al. .......................... 415/115 |
| 4,187,054 | | 2/1980 | Landis, Jr. et al. . |
| 4,214,851 | | 7/1980 | Tuley et al. . |
| 5,344,283 | * | 9/1994 | Magowan et al. .................. 415/115 |
| 5,593,277 | * | 1/1997 | Proctor et al. ................... 415/115 X |
| 5,762,471 | * | 6/1998 | Cunha ............................. 415/115 |
| 5,772,398 | * | 6/1998 | Noiret et al. ..................... 415/115 |
| 5,813,832 | | 9/1998 | Rasch et al. . |
| 5,997,245 | * | 12/1999 | Tomita et al. ..................... 415/115 |
| 6,019,572 | * | 2/2000 | Cunha ........................... 415/115 X |

OTHER PUBLICATIONS

"F404 Training Guide", Published by General Electric Company, Aircraft Engine Business Group, Technical Training Operation, Third Issue, Jul., 1982, 6 pages.

* cited by examiner

*Primary Examiner*—John E. Ryznic
(74) *Attorney, Agent, or Firm*—Andrew C. Hess; Rodney M. Young

(57) ABSTRACT

A gas turbine engine nozzle segment includes at least two circumferentially adjacent vanes joined together along an interface between the vanes. Each of the vanes includes a hollow airfoil disposed between radially inner and outer band panels and a cooling air intake duct leading to a hollow interior of the airfoil for directing cooling air into the hollow interior. The intake duct has a duct wall protruding radially outward from the outer band panel and at least one impingement cooling hole disposed through the intake duct wall and circumferentially and radially inwardly angled. A flange portion extends circumferentially along the outer band panel and an opening in the flange portion is in fluid communication with the intake duct. The hollow airfoil, radially inner and outer band panels, intake duct wall, and flange portion are integrally formed and, preferably, integrally cast such that the vane is a single piece integrally cast vane.

20 Claims, 3 Drawing Sheets

TURBINE NOZZLE SEGMENT BAND COOLING

The Government has rights in this invention pursuant to Contract No. N00019-98-C-0007 awarded by the Department of the Navy.

BACKGROUND OF THE INVENTION

1. Field of the Invention

This invention relates to aircraft gas turbine engine turbine nozzle segments and, more particularly, to cooling of bands between which airfoils of the segments are mounted.

2. Discussion of the Background Art

In a typical gas turbine engine, air is compressed in a compressor and mixed with fuel and ignited in a combustor for generating hot combustion gases. The gases flow downstream through a high pressure turbine (HPT) having one or more stages including a HIT turbine nozzle and LPT rotor blades. The gases then flow to a low pressure turbine (LPT) which typically includes multi-stages with respective LPT turbine nozzles and LPI rotor blades. Each LPT turbine nozzle includes a plurality of circumferentially spaced apart stationary nozzle vanes supported between radially outer and inner bands. Each turbine rotor stage includes a plurality of circumferentially spaced apart rotor blades extending radially outwardly from a rotor disk which carries torque developed during operation.

The LPT nozzles are typically formed in arcuate segments having a plurality of vanes integrally joined between corresponding segments of the outer and inner bands. Each nozzle segment is supported at its radially outer end by a flange bolted to an annular outer casing. Each vane has a cooled hollow airfoil disposed between radially inner and outer band panels which form the inner and outer bands, a flange portion along a mid portion of the outer band panel, and a cooling air intake duct for directing cooling air through an opening in the flange portion into the hollow interior or cooling circuit of the airfoil. The intake duct has a 90 degree bend between an axially forward intake duct inlet and an axially aft and radially inward intake duct outlet. The 90 degree bend curves radially inwardly from the opening which in the flange portion toward the hollow airfoil and axially as it extends aft and ends at an intake duct outlet. The airfoil, inner and outer band portions, flange portion, and intake duct are typically cast together such that each vane is a single casting. The vanes are brazed together along interfaces of the flange segments, inner band panels, and outer band panels to form the nozzle segment. The intake duct has a significant amount of convective cooling which it conducts to the band locally but not to the middle of the band between the intake ducts or airfoils. This region of the band between intake ducts operates significantly hotter.

Low pressure turbine nozzle bands are often not cooled, however, advanced engine designs with increased thrust to weight ratios operate at higher turbine inlet temperatures that require more cooling. Cooling schemes that use cooling air from the compressor enhance band cooling for a given amount of cooling flow but also have significant negative effects on engine performance. Impingement baffles, film holes, pin banks and trailing edge holes are all cooling features that have been used in production engines for cooling HPT nozzle bands. Cooling holes disposed through the flange have been used to direct cooling air from a cooling air plenum onto the braze joint along the interface between the outer band panels of the flange portions of an LPT nozzle band. Location of the cooling holes that are disposed through the flange include avoiding obstruction by bolt heads in a flange joint with the engine casing and the cooling air jet from the holes travels far before impinging the band at highly stressed areas further aft of the flange.

It is highly desirable to improve LPT band cooling while minimizing the amount of cooling flow used to do so. It is also highly desirable to improve LPT band cooling to prevent cracking along brazed joints to extend the life of the part and time between repairs of the nozzle segments and vane assemblies. It is desirable to have the impingement jet strike the band farther aft than currently possible without increasing the distance the jet target travels to impingement, thus, minimizing jet velocity decay and improving the convection over the band from the jet. It is also desirable to allow more flexibility in choosing impingement jet location, orientation and angle to the band surface, thus, permitting maximization of cooling effect.

SUMMARY OF THE INVENTION

A gas turbine engine nozzle segment includes at least two circumferentially adjacent vanes joined together along an interface between the vanes. Each of the vanes includes a hollow airfoil disposed between radially inner and outer band panels and a cooling air intake duct leading to a hollow interior of the airfoil for directing cooling air into the hollow interior. The intake duct has a duct wall protruding radially outward from the outer band panel and at least one impingement cooling hole disposed through the intake duct wall and circumferentially and radially inwardly angled.

A flange portion extends circumferentially along a mid portion of the outer band panel and an opening in the flange portion is in fluid communication with the intake duct. The hollow airfoil, radially inner and outer band panels, intake duct wall, and flange portion are integrally formed and preferably integrally cast such that the vane is a single piece integrally cast vane.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DESCRIPTION OF THE PREFERRED EMBODIMENT(S)

Figure 1:
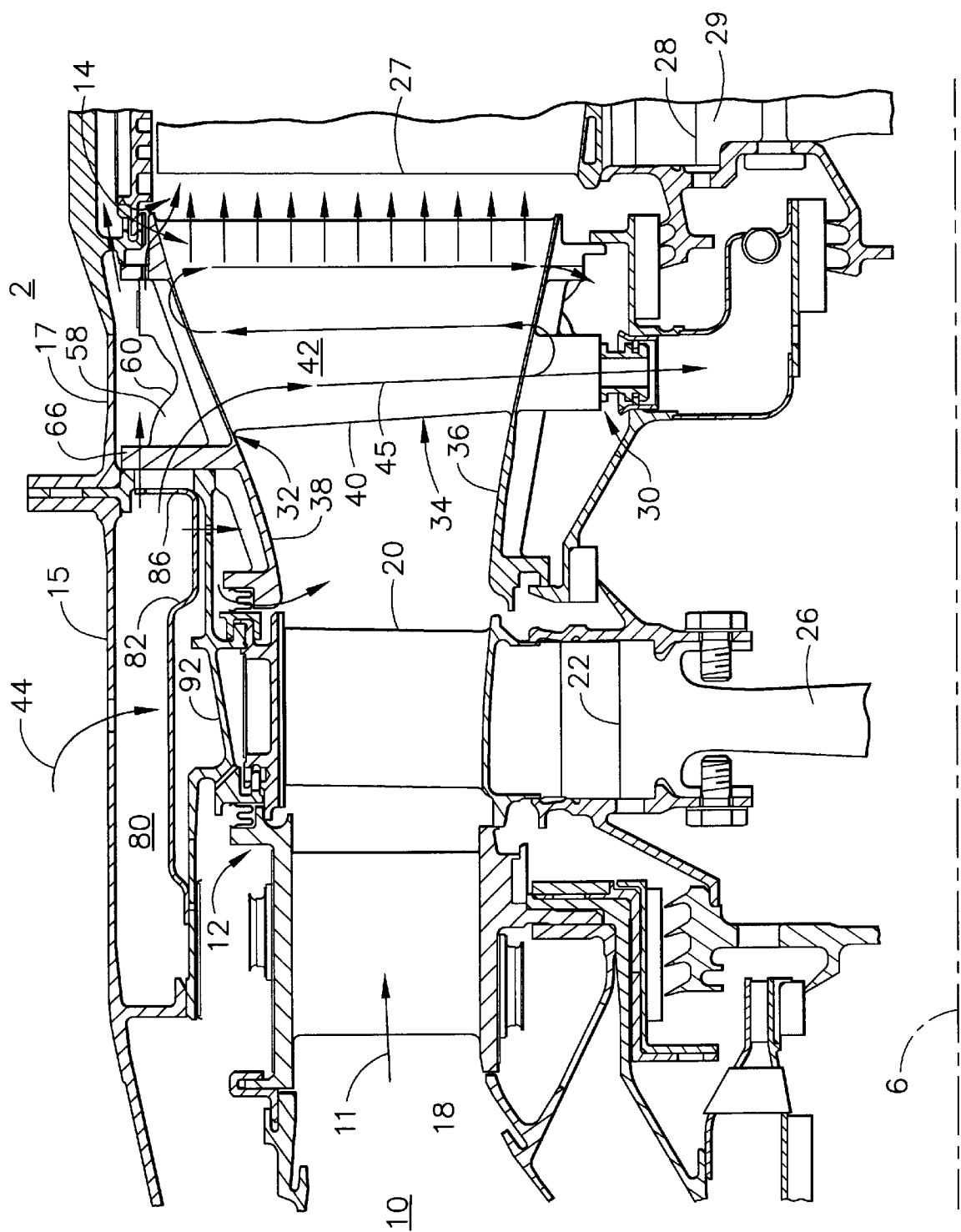
FIG. 1 is a schematic cross-sectional view illustration of gas turbine engine high and low pressure turbine sections with an exemplary embodiment of a low pressure turbine nozzle assembly of the present invention.

Illustrated in FIG. 1, is a portion of an aircraft gas turbine engine hot section, generally designated 2, having an axial extending centerline 6 about which runs through a combustor 10, a high pressure turbine (HPT) 12, and a first stage of a low pressure turbine (LPI) 14. Circumscribed about centerline 6 is high pressure casing 15 around the combustor 10 and the HPT 12 and a low pressure casing 17 around the LPI 14. Air is compressed in a compressor (not shown) and mixed with fuel in the combustor 10 to produce a high energy hot gas stream 11. Aft of the combustor 10 is a HPT nozzle 18 which directs the hot gas stream 11 from the combustor to HPT blades 20 mounted on a first periphery 22 around a HPT disk 26. The hot gas stream 11 is then flowed through a LPT nozzle assembly 30 having an assembly of arcuate LPT nozzle segments 32, illustrating an exemplary embodiment of the present invention, which directs the hot gas stream to LPT blades 27 mounted on a second periphery 28 around a LPT disk 29.

Figure 2:
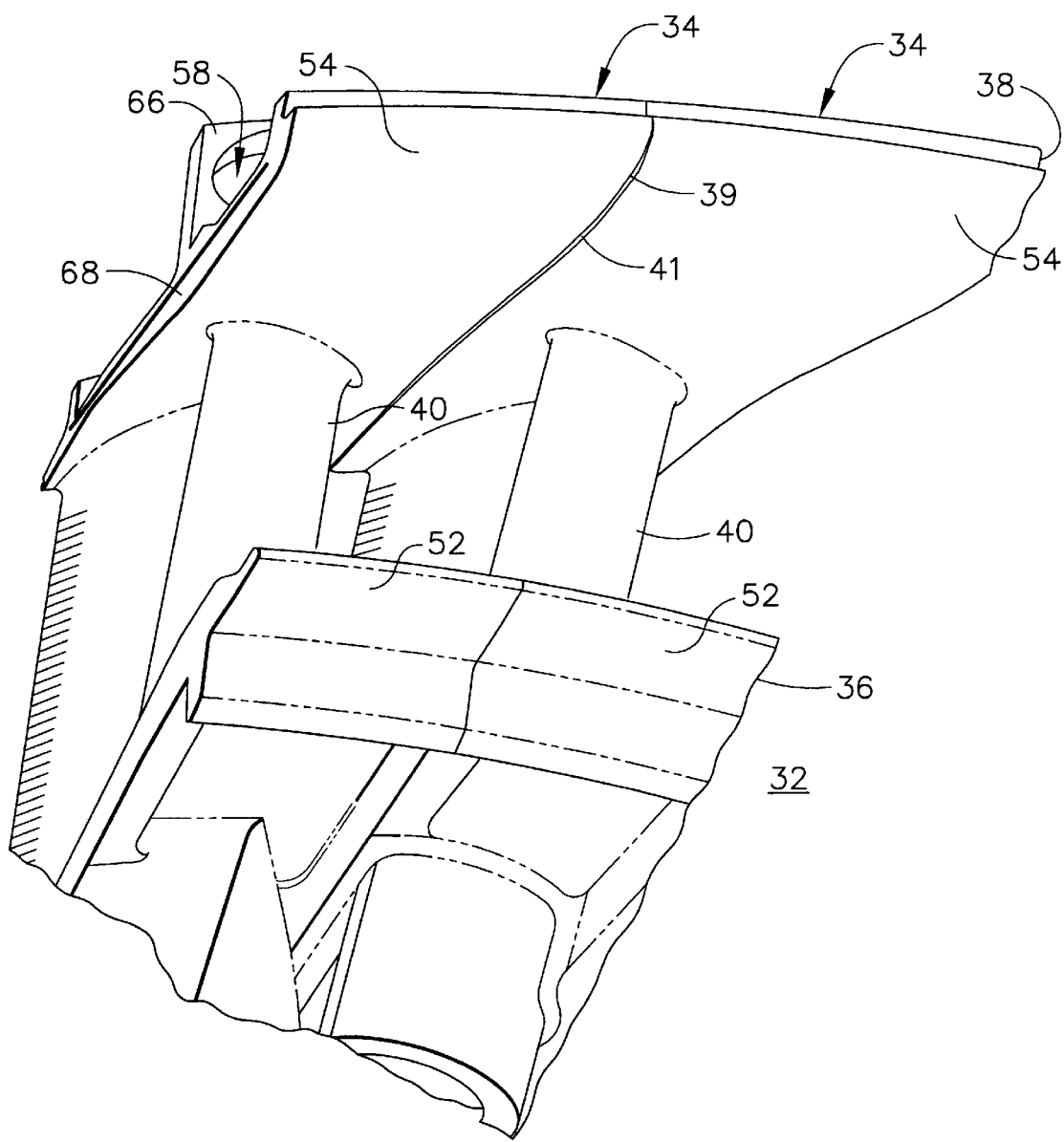
FIG. 2 is a perspective view illustration of a nozzle segment of the nozzle assembly in FIG. 1 from a radially inward point looking radially outwardly and axially aftwardly.

One of circumferentially adjoining nozzle segments 32 is illustrated in FIG. 2. Each of the nozzle segments 32 includes two or more circumferentially spaced apart nozzle vanes 34, two for example, having hollow airfoils 40 extending radially between arcuate radially inner and outer bands 36 and 38 formed integrally therewith. The hollow airfoils 40 each have a hollow interior 42 (illustrated in FIG. 1) for receiving cooling air 44 for cooling the airfoils 40 and HPT and LPT blades 20 and 27 and and LPT disks 26 and 29 respectively. The hollow interior 42 is schematically illustrated as a cooling air circuit 45 in FIG. 1.

Figure 3:
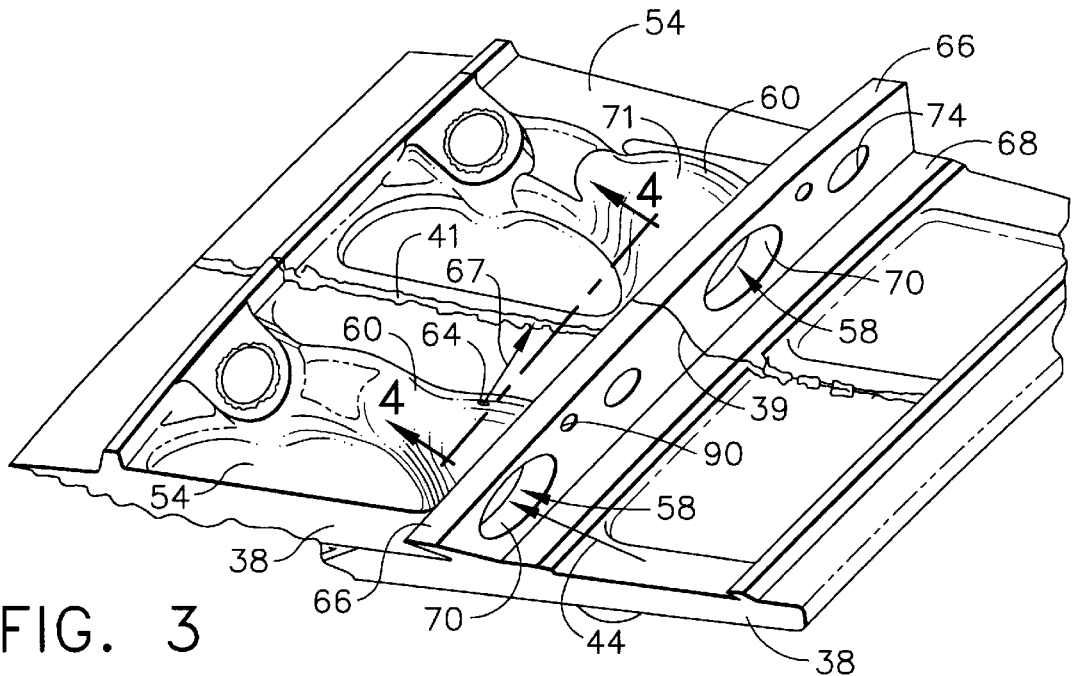
FIG. 3 is a perspective view illustration of a radially outer band of the nozzle segment in FIG. 2.

Referring to FIGS. 2 and 3, each of the vanes 34 includes one of the hollow airfoils 40 disposed between radially inner and outer band panels 52 and 54. The circumferentially adjacent ones of the inner and outer band panels 52 and 54 form corresponding ones of the inner and outer arcuate bands 36 and 38. Adjacent ones of the vanes 34 in the nozzle segments 32 are joined together along an interface 39, typically, by brazing to form a brazed joint 41. An air intake duct 58 leads to the hollow interior 42 of the airfoil 40 for directing cooling air into the hollow interior and, more particularly, into the cooling air circuit 45. The intake duct 58 has a duct wall 60 protruding radially outward from the outer band panel 54.

Figure 4:
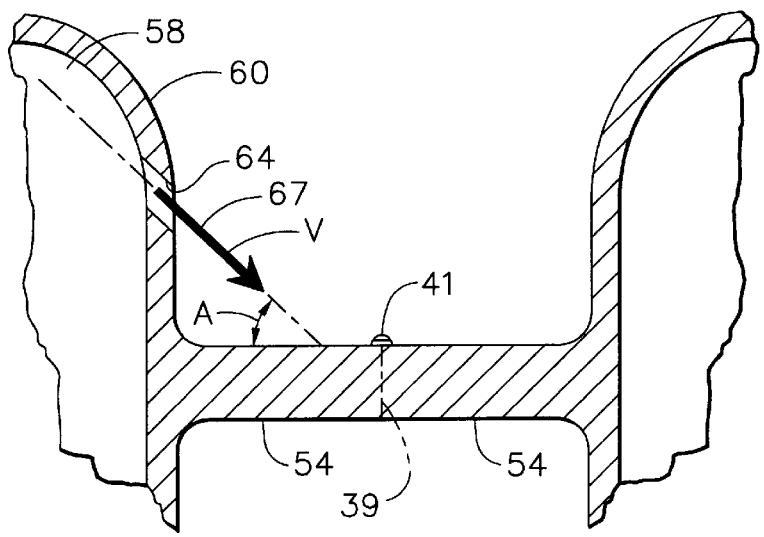
FIG. 4 is a schematic crosss-sectional view illustration of an impingement cooling hole through a wall of an intake duct taken through lines 4—4 of a radially outer portion of the nozzle segment in FIG. 3.

The present invention provides a cooling air impingement means for directing cooling air 44 from the intake duct 58 to impinge onto the outer band 38 at the brazed joint 41 between adjacent ones of the outer band panels 54 as illustrated in FIGS. 3 and 4. The cooling air impingement means is operable to impinge the cooling air on the outer band 38 with a circumferential and radially inward velocity V so as to provide cooling of the brazed joint 41 and the outer band panel 54 at an operationally heat induced distressed location. This location is preferably one at which a substantially maximum heat induced stresses occur. The impingement cooling air also provides additional convective cooling of the outer band 38 after it impinges on the outer band. The cooling air impingement means used in the exemplary embodiment includes at least one impingement cooling hole 64 disposed through the intake duct wall 60 and which is circumferentially and radially inwardly angled at an angle A and generally directs a cooling air impingement jet 67 towards the outer band panel 54, the interface 39, and, more particularly, at the brazed joint 41 near the distressed location. Other cooling air impingement means for directing cooling air 44 from the intake duct 58 onto the outer band 38 include, but are not limited to, one or more impingement cooling holes 64 disposed through one or more of the intake duct walls 60 of the outer band panels 54 of the LPT nozzle segment 32. Apertures other than the impingement cooling holes 64 may also be used such as slots or slits.

Figure 5:
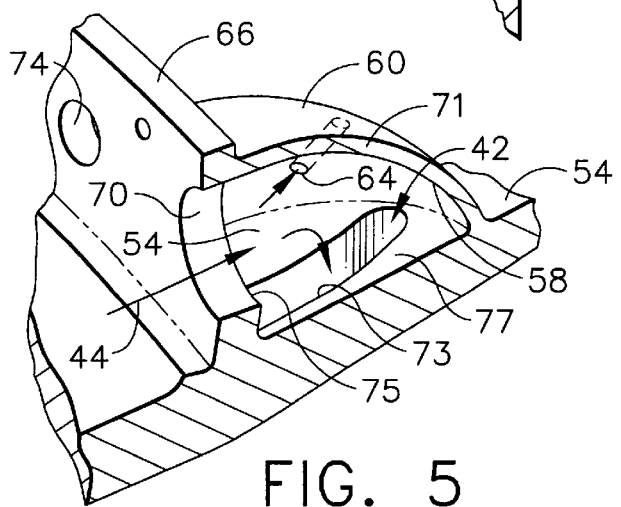
FIG. 5 is a cut-a-way perspective view illustration of the intake duct in FIGS. 1 and 4.

A flange portion 66 extends circumferentially along an axially located mid portion 68 of the outer band panel 54 and an opening 70 in the flange portion is in fluid communication with the intake duct 58. Further referring to FIG. 5, the intake duct 58 has a 90 degree bend 71 between an axially forward intake duct inlet 75 and an axially aft and radially inward intake duct outlet 77. The 90 degree bend curves radially inwardly from the opening 70 in the flange portion toward the hollow airfoil and axially as it extends aft and ends at the intake duct outlet 77 on the outer band panel 54. The intake duct 58 changes in crossectional shape between the intake duct inlet 75 to the intake duct outlet 77. The intake duct 58 changes in cross-sectional shape from a cross-sectional first shape which is circular to a cross-sectional second shape of the intake duct outlet 77 which is rounded though not circular and shaped to facilitate cooling air entry into a vane cooling inlet 73. Cooling air 44 enters the hollow interior 42 and cooling air circuit 45 through the vane cooling inlet 73 which coincides with the intake duct outlet 77.

The hollow airfoil 40, radially inner and outer band panels 52 and 54, intake duct wall 60, and flange portion are integrally formed and preferably integrally cast such that the vane 34 is a single piece integrally cast vane. The flange portion 66 includes bolt holes 74 by which the flange portion is bolted to a support 92 between the high pressure and low pressure casings 15 and 17 as illustrated in FIG. 1. A cooling air cavity 80 is located radially outwardly of the HPT 12 and axially between the combustor 10 and the LPT 14. Cooling air 44 from a stage of the compressor, such as the fourth stage of a GE 404 engine, is piped into the cavity 80 for cooling the hot section 2 of the engine. The pressurized cooling air 44 flows through cooling air holes 86 in a heat shield 82 to and through the opening 70 and into the intake duct 58, thus, supplying cooling air to the cooling air circuit 45 and the impingement cooling hole 64. Alternatively, a set of second impingement cooling holes 90 may be disposed through the flange portion 66 as done in the prior art.

While there have been described herein, what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by letters patent of the United States is the invention as defined and differentiated in the following claims:

What is claimed is:

1. A gas turbine engine vane comprising:
   a hollow airfoil disposed between radially inner and outer band panels;
   a cooling air intake duct leading to a hollow interior of said airfoil, said intake duct having a duct wall protruding radially outward from said outer band panel; and
   at least one cooling air impingement means disposed through said intake duct wall for directing cooling air to impinge on said outer panel with a circumferentially and radially inwardly angled velocity.

2. A vane as claimed in claim 1 wherein said impingement means comprises an impingement cooling hole disposed through said intake duct wall and circumferentially and radially inwardly angled.

3. A vane as claimed in claim 2, further comprising a flange portion circumferentially extending along said outer band panel and an opening in said flange portion, said opening in fluid communication with said intake duct.

4. A vane as claimed in claim 3 wherein said flange portion is integral with said intake duct wall and said opening is an intake duct inlet through said flange portion into said intake duct.

5. A vane as claimed in claim 4 wherein said hollow airfoil, radially inner and outer band panels, intake duct wall, and flange portion are integrally formed.

6. A vane as claimed in claim 4 wherein said hollow airfoil, radially inner and outer band panels, intake duct wall, and flange portion are integrally cast such that said vane is a single piece integrally cast vane.

7. A vane as claimed in claim 2 wherein said intake duct includes:

an intake duct inlet in fluid communication with said opening, an intake duct outlet in fluid communication with said hollow interior of said airfoil, and a bend between said intake duct inlet and intake duct outlet.

8. A vane as claimed in claim 7 wherein said intake duct changes in cross-sectional shape from a cross-sectional first shape of said intake duct inlet to a cross-sectional second shape of said intake duct outlet.

9. A vane as claimed in claim 8, further comprising a flange portion circumferentially extending along said outer band panel and an opening in said flange portion, said opening in fluid communication with said intake duct.

10. A vane as claimed in claim 9 wherein said flange portion is integral with said intake duct wall and said opening is an inlet through said flange portion into said intake duct.

11. A vane as claimed in claim 10 wherein said hollow airfoil, radially inner and outer band panels, intake duct wall, and flange portion are integrally formed.

12. A vane as claimed in claim 10 wherein said hollow airfoil, radially inner and outer band panels, intake duct wall, and flange portion are integrally cast such that said vane is a single piece integrally cast vane.

13. A gas turbine engine nozzle segment comprising:

at least two circumferentially adjacent vanes joined together along an interface between said vanes, each of said vanes comprising;

a hollow airfoil disposed between radially inner and outer band panels, a cooling air intake duct leading a hollow interior of said airfoil, said intake duct having a duct wall protruding radially outward from said outer band panel, a flange portion circumferentially extending along said outer band panel and an opening in said flange portion, said opening in fluid communication with said intake duct; and a first impingement cooling hole disposed through said intake duct wall of one of said at least two circumferentially adjacent vanes, said impingement cooling hole being circumferentially and radially inwardly angled.

14. A gas turbine engine nozzle segment as claimed in claim 13 wherein for each of said vanes said intake duct includes:

an intake duct inlet in fluid communication with said opening, an intake duct outlet in fluid communication with said hollow interior of said airfoil, and a bend between said intake duct inlet and intake duct outlet.

15. A gas turbine engine nozzle segment as claimed in claim 14 wherein for each of said vanes said intake duct changes in cross-sectional shape from a cross-sectional first shape of said intake duct inlet to a cross-ectional second shape of said intake duct outlet.

16. A gas turbine engine nozzle segment as claimed in claim 15 wherein for each of said vanes said flange portion is integral with said intake duct wall and said opening is an inlet through said flange portion into said intake duct.

17. A gas turbine engine nozzle segment as claimed in claim 16 wherein for each of said vanes said hollow airfoil, radially inner and outer band panels, intake duct wall, and flange portion are integrally cast such that said vane is a single piece integrally cast vane.

18. A gas turbine engine nozzle segment as claimed in claim 17 wherein said circumferentially adjacent vanes are brazed together along said interface between said vanes and said first impingement cooling hole is aimed at said interface.

19. A gas turbine engine nozzle segment as claimed in claim 18 wherein said impingement cooling hole is aimed at a location at which substantially maximum heat induced stresses occur.

20. A gas turbine engine nozzle segment as claimed in claim 18 further comprising a second impingement cooling hole disposed through said intake duct wall of other of said at least two circumferentially adjacent vanes, said second impingement cooling hole being circumferentially and radially inwardly angled and aimed at said interface.

* * * * *